Feb. 8, 1927.
W. RAHE
1,617,027
SPRING BUMPER
Filed Jan. 9, 1925
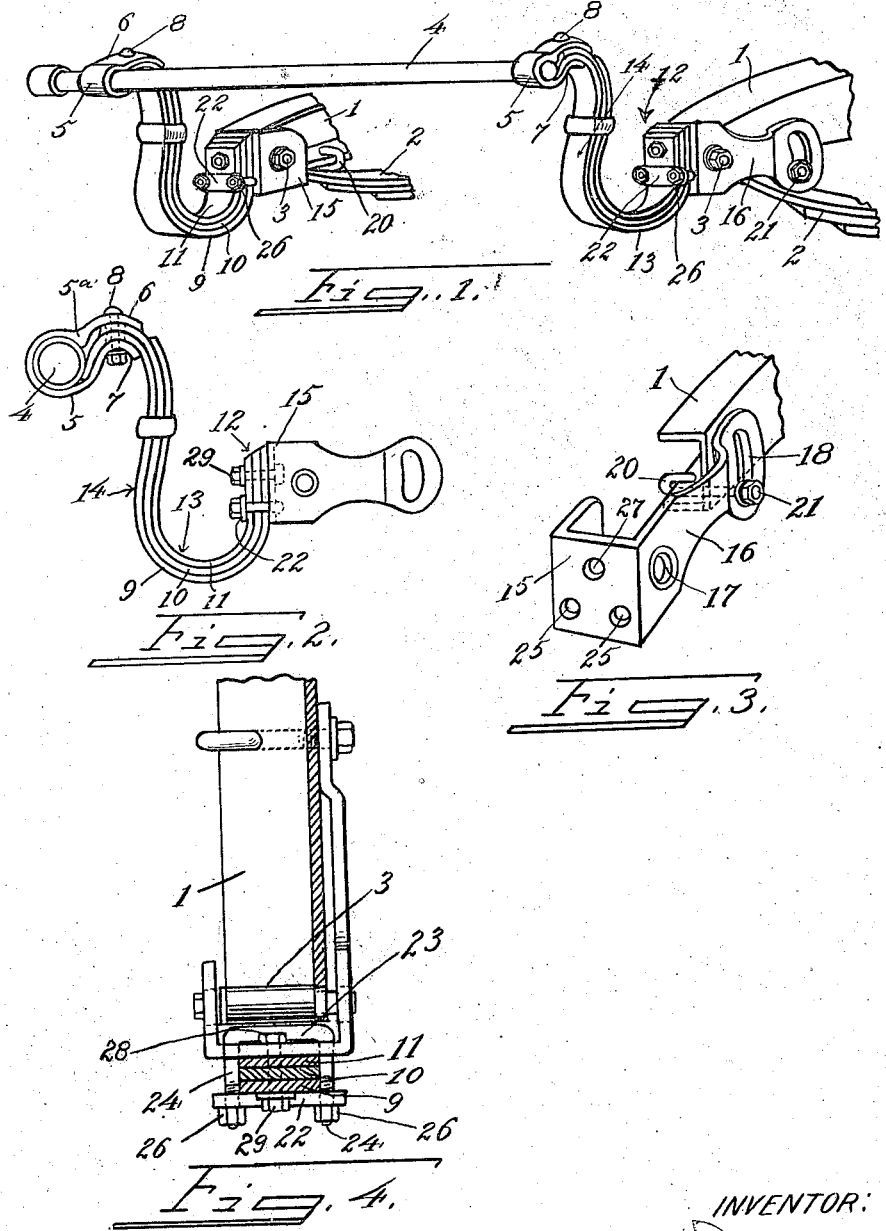
INVENTOR:
William Rahe
BY Albert Allen
ATTORNEYS.

Patented Feb. 8, 1927.

1,617,027

UNITED STATES PATENT OFFICE.

WILLIAM RAHE, OF NEWTOWN, OHIO.

SPRING BUMPER.

Application filed January 9, 1925. Serial No. 1,462.

My invention relates to bumpers for automobiles and the like, in which an impact bar is supported on leaf springs from the frame of the vehicle.

Bumpers of the same general type as provided by me are difficult to bring up to standard because the requirements for a bumper are quite strict, and the provision of a mounting device for the S-shaped springs that will serve in case of accident or collision and is at the same time adjustable, presents a serious problem.

It is the object of my invention to provide an inexpensive structure, using leaf springs in plural numbers, but so providing that the springs have no particular lines of weakness due to improper attachment, improper curves, or improper location with respect to the vehicle to be protected. It is further my object to provide a bumper which will minimize the possibility of damage to a car because of collision with another in which the impact bar of the bumper is attached at a lower level than my bumper and so passes under it. This is provided in the construction hereinafter described by extending the springs well forward in a curve with a vertical axis to resist an impact and providing an unusual depth of abutment surface. Among other things my invention includes a mounting for the impact bar which does not interfere with the free action of the springs and which is strong and attractive in appearance, but can be removed and replaced without particular mechanical skill or tools. The attachment of the impact bar is not accomplished by compressing the spring support about the bar, thereby giving it improper tension.

In this connection it should be noted that the great defect in bumpers of the impact bar and spring type, is that the springs are too brittle or too heavy, and the bar itself rattles. I avoid the former defect by the arrangement of multiple leaf springs, with the one end of the leaves left to slide on each other. The proper degree of resilience can be imparted to the leaves without exposing them to breaking because of lightness of their bodies. As to the impact bar, by avoiding a mere clamping of the bar to the leaf spring, and using a clamp or eyelet which has a cam-like projection on its inner periphery, I am enabled to engage the bar so tightly, without any effect on the springs, that the rattling is entirely done away with.

In the mounting of the springs on the vehicle, I provide a device which avoids the necessity of laying the leaves flat against the top of the frame channel, thereby cutting down the permissible radius of the curve to the springs. My device holds the ends of the springs in a vertical position, and is also adjustable about the spring shackle bolt as a pivot, to provide for a preferential adjustment of the bar.

My springs form together with the device for attaching the impact bar a true S-curve, with the general axial lines of the curves substantially vertical, which gives long range of movement to the impact bar, with the springs bending all along their length.

By attaching the clamps for the impact bar to the longer of the multiple leaves of my spring, I obtain great resilience at the start of motion of the bar, but on any severe blow the other leaves come into action. In my preferred form I provide for a full ten inches of movement of the impact bar.

These objects and advantages I accomplish by that certain construction and arrangement of parts to be hereinafter more specifically pointed out and claimed.

In the drawing:

Figure 1 is a perspective view of the bumper, as installed.

Figure 2 is a side elevation of one of the spring elements and attachment parts.

Figure 3 is a perspective of the mounting clip.

Figure 4 is a plan view of the spring mounting device assembled with the frame of a vehicle.

The usual motor vehicle frame terminates in downwardly curved channel bars 1, to which a spring 2 for the vehicle is attached by a shackle bolt 3.

My bumper device comprises an impact bar 4, which can be of any desired conformation. A pair of mounting clamps 5 are provided, which are bent around the impact bar, and have two ends 6 and 7, which are bolted or riveted to the ends of the mounting springs, as by the bolts 8.

A lug 5ᵃ is formed on the inner face of the clamps, which will engage the bar when the clamps are mounted and jam it tightly in place. The spring leaves are slotted to receive the bolts 8, so as to give the individual leaves sufficient freedom of play.

The springs are formed in the instance illustrated, which is the preferred form, of three leaves 9, 10 and 11. The three leaves are formed with a substantially vertical stand 12, a deep curve 13, an upright stand having a curve to form the middle of the S, as at 14, and a downwardly extending portion finishing off the S-shaped curve, with the inner leaf 11 terminated below the top of this last curve, and the middle leaf 10 terminated at the top of the curve.

The impact bar mounting clamps are secured thus through two of the leaves only, leaving play for the third leaf, but providing a support for the bar by one leaf only at the tips of the springs, thereby giving great resilience to slight blows.

The clip for mounting the springs on the ends of the vehicle channels, is formed of a piece having a U-shaped end 15, and an attachment and adjusting arm 16. The portion 15 has holes therein as at 17 for reception of the shackle bolt 3. The arm 16 has an arcuate slot 18 therein, through which passes a hook bolt, having a hook 20 for engagement around the lower channel wall of the vehicle frame piece, and a threaded nut 21, for engaging the outer face of the arm about the said arcuate slot.

By this mounting device, the mounting clip can be swung through a limited arc, and fastened tightly in a desired position.

To secure the leaf springs to the mounting clip I provide a plate 22, which is arranged to bear on the outer face of the vertical stand portion 12 of the spring assembly. A U-bolt is arranged with its cross piece 23 inside of the mounting clip and its ends 24 projecting through holes 25 in the face of the U-shaped portion 15. The ends pass through the plate 22 and nuts 26, turned down on the ends 24, clamp the spring firmly against the face of the mounting clip.

I show an additional hole 27 in the face of the clip, and the springs are pierced with a hole for reception of a bolt 28 passed through the clip, with its nut 29 turned down against the face of the vertical stand of the leaf springs. This bolt does not take the strain of the impact bar, when actuated, but serves to prevent the vertical stand from tilting about, if the clamping plate 22 becomes too loose.

It can be readily observed that the action of the springs under a blow imparted to the impact bar, will be to bend at all of the curves, which are regular in their nature, so as to take up the movement without any particular portion of the strain being applied to a particular portion of the spring, the resistance of the springs being progressively stronger the greater the length of movement of the bar. The difficulty with any spring attachment, which must have a lever action, is that a strain which is applied at a particuler line across the springs, will break them at this line. My springs will bend at both ends of the S-like arrangement, without placing too great a strain at the fulcrum point which is the line of engagement of the clamp plate 22.

The impact bar, the springs, and the mounting pieces can be replaced without mechanical difficulty. The relative position of the impact bar to the vehicle can be adjusted and the springs do not tend to be forced under the vehicle, since the axial lines of the several curves are vertical, and the impact bar will tend to move back toward the vehicle in a substantially horizontal plane.

Having thus described my invention, what I claim as new and desire to secure by Letters Patent, is:

1. A bumper device for vehicles, comprising an impact bar, a plurality of leaf springs, each formed of plural leaves, said springs having a curved formation terminating above their point of attachment, means for securing the impact bar detachably to the upper end of the springs, and means for securing the springs to the vehicle, comprising a mounting device, having a vertical face against which the springs are clamped, and means for detachably securing said mounting device to the vehicle frame.

2. A bumper device for vehicles, comprising an impact bar, a plurality of leaf springs, each formed of plural plies, and bent to form a downward curve, whence they curve upwardly, terminating well above the downward bend in a point of attachment for the impact bar, means for securing the impact bar to said springs, and means for mounting the springs on the vehicle frame, comprising devices having a vertical face against which the springs are clamped.

3. A bumper device for vehicles, comprising an impact bar, a plurality of leaf springs having vertical lower portions, and thence curved downwardly, and then upwardly to a higher elevation, means for securing the impact bar to the higher portions of the springs, said means being separate pieces secured to the bar and the springs, and means for mounting the springs on the vehicle comprising members secured to the vehicle and presenting a vertical face against which the vertical lower portions of the springs are attached.

4. A bumper device for vehicles, comprising an impact bar, a plurality of leaf springs secured to the vehicle frame, and thence bending in a downward and then an upward curve to a higher elevation, and means for mounting the impact bar on the springs comprising clips engaging around the bar and having ends overlapping the two faces of the springs, and means for securing said ends to the springs.

5. A bumper device for vehicles, comprising an impact bar, a plurality of leaf springs having a curved body to the upper ends of which the impact bar is secured, said springs terminating in flat lower ends, and mounting devices having flat faces, means for securing the ends against said faces, and means for mounting said devices on the frame of the vehicle, said means comprising a pivot support on the said frame for said devices, and means for clamping another portion of said devices to the vehicle frame.

6. A bumper device for vehicles, comprising an impact bar, a plurality of leaf springs having a curved body, to the upper ends of which the impact bar is secured, said springs terminating in flat lower ends, and mounting devices having flat faces, means for securing the ends against said faces, and means for mounting said devices on the frame of the vehicle, said means comprising a pivot support on the same frame for said devices, and means for clamping another portion of said devices to the vehicle frame, said last named means being adjustable so as to permit of adjustment of the said devices about said pivot.

7. In combination, an impact bar, and leaf springs for supporting the same, of means for securing the leaf springs to the frame of a vehicle, comprising clips pivoted on the ends of the frame, means for mounting the springs on the clips, and means for adjustably engaging the clips and the frame to secure said clips in adjusted pivotal relation on the frame.

8. In combination, an impact bar, and supporting springs therefor, said springs to be secured to a vehicle, and said springs having plural leaves, formed as a curve and terminating with a single one of the leaves, and means for mounting the bar on the springs comprising members to engage over the bar, and to engage with the single terminating leaf of said springs, and means for securing the said members to the springs.

WILLIAM RAHE.